Patented Sept. 10, 1940

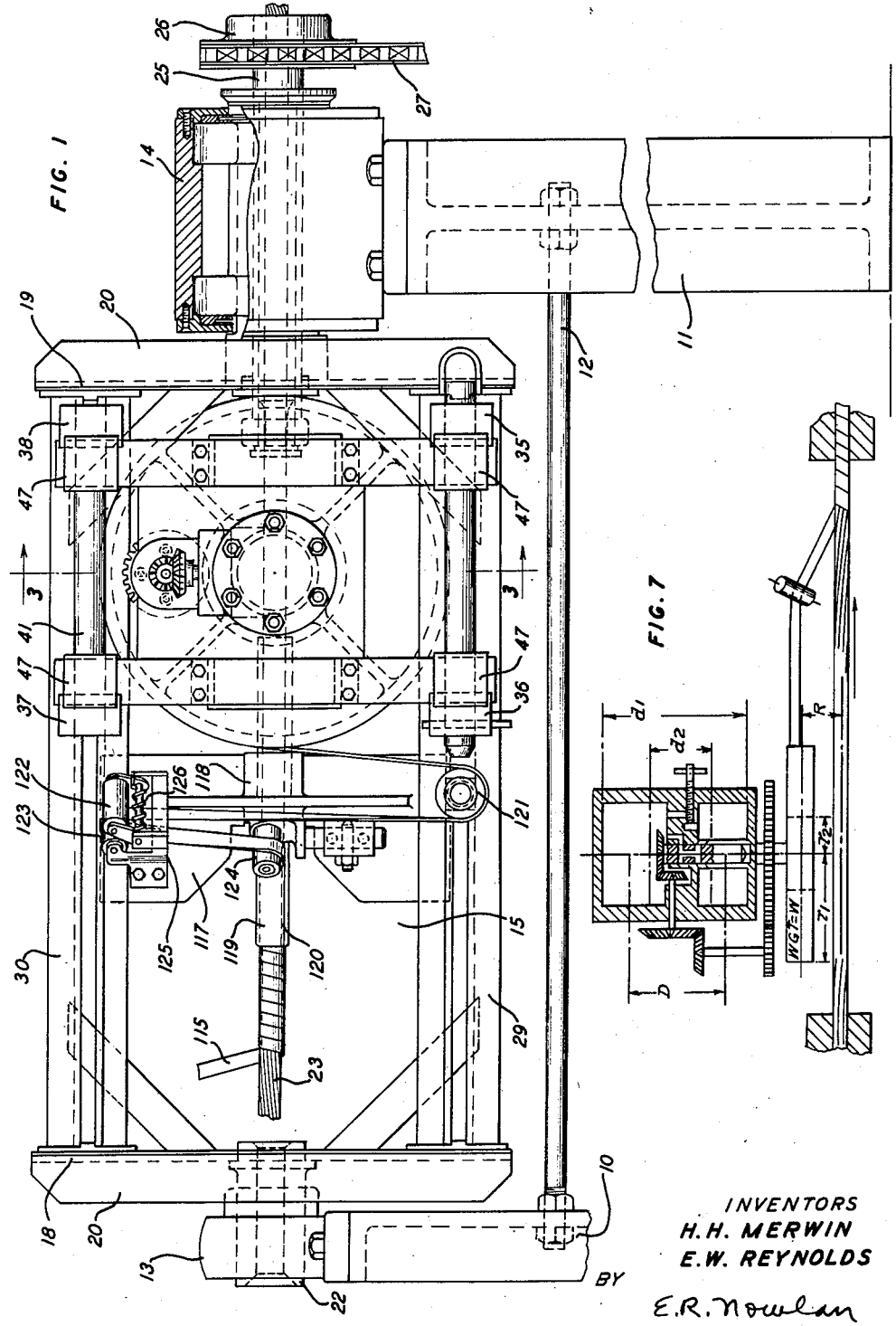

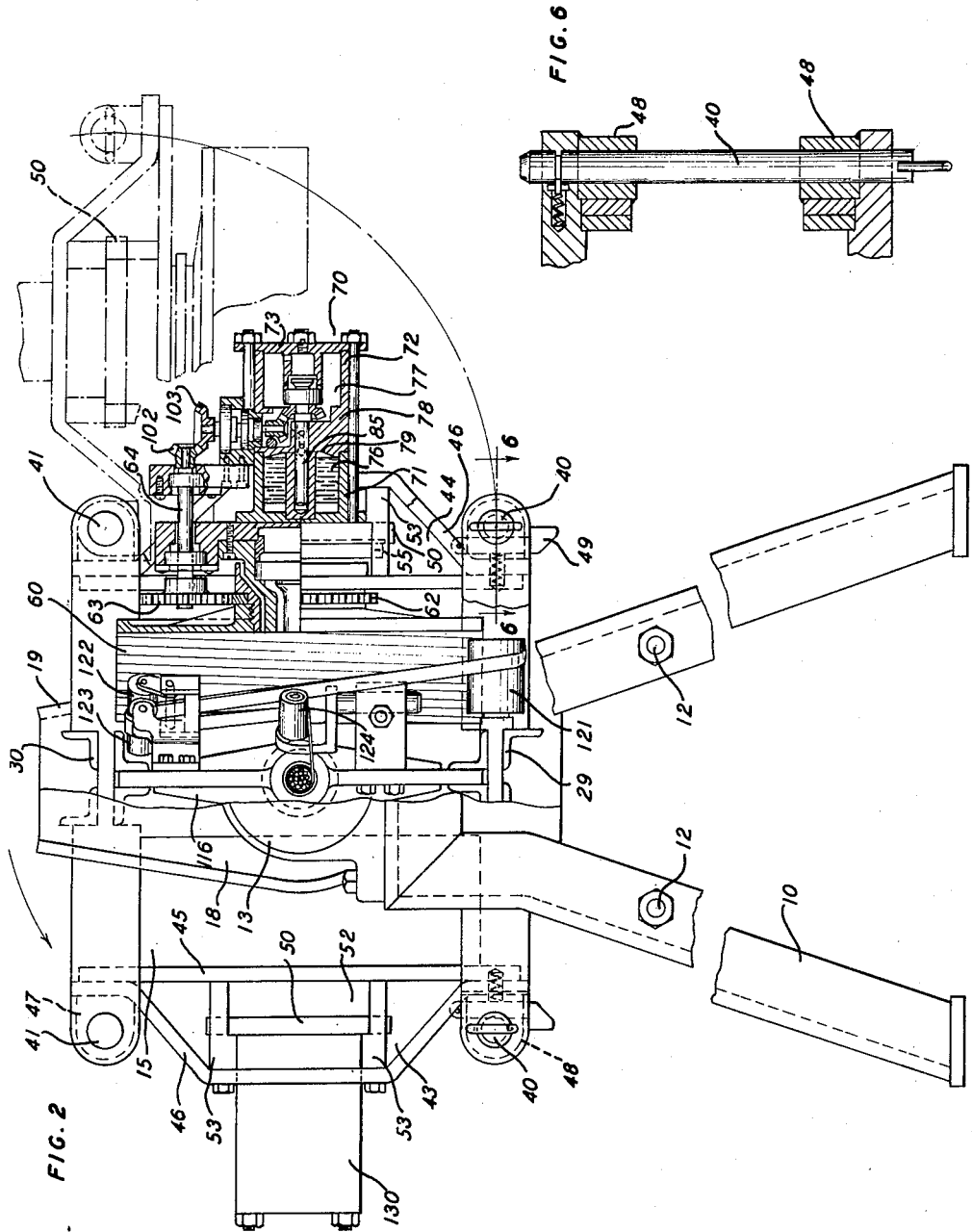

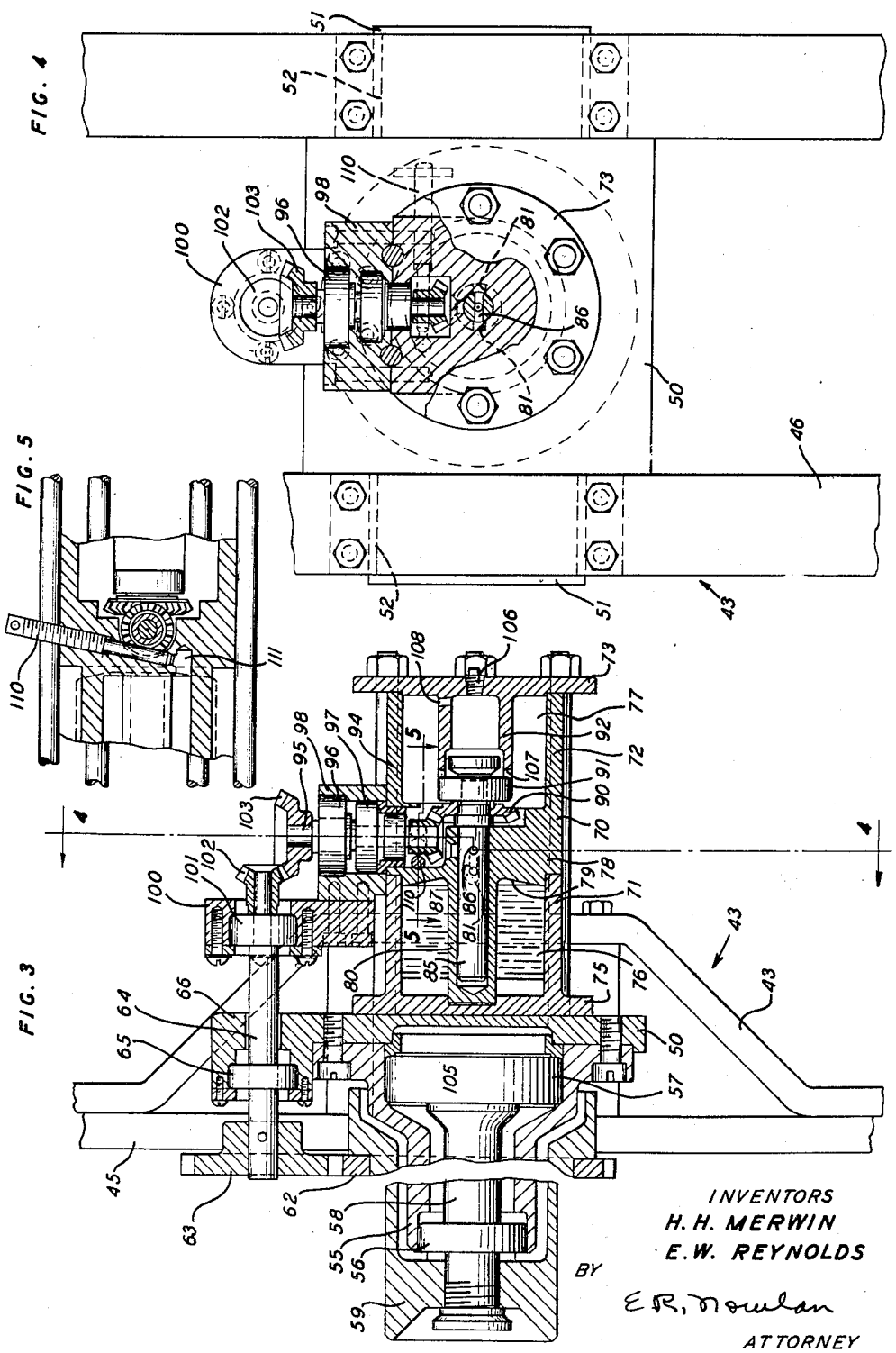

2,214,340

UNITED STATES PATENT OFFICE 2,214,340

MATERIAL HANDLING APPARATUS

Harry H. Merwin, Rutherford, and Ellwood W. Reynolds, Westfield, N. J., assignors to Western Electric Company, Incorporated, New York, N. Y., a corporation of New York Application November 5, 1938, Serial No. 239,002

23 Claims. (Cl. 57—10)

This invention relates to a material handling apparatus, and more particularly to an apparatus for serving a covering material on an advancing core.

In forming coverings on cores, for example in wrapping a tape from a pad spirally about an advancing core, a serving head supporting the pad is, in some instances, rotated about the advancing core and frequently in such instances the decrease in the weight of the pad as the tape is removed therefrom causes an unbalancing of the serving head affecting the smooth and uniform operation of the apparatus.

An object of the invention is to provide an efficient and uniformly operable constantly balanced material handling apparatus.

With this and other objects in view, the invention comprises an apparatus having a rotary unit axially apertured for the advancement of a core to be covered, the serving head including a support for a pad of serving material rotated as the material is removed from the pad to actuate a valve to release predetermined quantities of a fluid from one chamber to another to cause constant balancing of the serving head as the weight of the pad varies.

Other objects and advantages will be apparent from the following detailed description when taken in conjunction with the accompanying drawings, wherein:

Fig. 1 is a front elevational view of the apparatus, portions thereof being broken away;

Fig. 2 is an end elevational view, portions thereof being broken away;

Fig. 3 is an enlarged fragmentary sectional view taken along the line 3—3 of Fig. 1;

Fig. 4 is a fragmentary sectional view taken substantially along the line 4—4 of Fig. 3;

Fig. 5 is a fragmentary sectional view taken along the line 5—5 of Fig. 3;

Fig. 6 is a fragmentary sectional view taken along the line 6—6 of Fig. 2; and

Fig. 7 is a schematic view of the apparatus to illustrate the balancing of a rotary unit therein.

Referring now to the drawings, wherein like reference numerals designate similar elements throughout the views, numerals 10 and 11 designate end frame supports of the general structure and contour shown in Figs. 1 and 2 and connected to each other by brace rods 12. Suitable bearings 13 and 14 are mounted upon the supports 10 and 11, respectively, to rotatably support a unit 15 which, in the present embodiment, is a serving head capable of serving tape spirally about an advancing core.

The rotary unit 15 is composed of head members 18 and 19 of the general contour illustrated in Figs. 1 and 2 and formed of suitable material, such as sheet metal, having side edges bent outwardly at right angles, as indicated at 20, to form reenforcing flanges. Adjacent the center of the head member 18, an aperture is formed to receive a hollow shaft 22 which is rigidly mounted upon the head member, its central aperture serving as a passageway for a core 23. As shown in Fig. 1, the shaft 22 is journalled in the bearing 13. The head member 19 is similarly apertured at its center, where a hollow shaft 25 is rigidly mounted and journalled in the bearing 14, the central aperture of the shaft serving also as a passageway for the advancing core 23. At the outer end of the shaft 25 suitable means is provided to connect the shaft with a power means (not shown) to rotate the unit, the means suggested in this embodiment being a sprocket wheel 26 and a chain 27.

The head members 18 and 19 are connected together to form a rigid frame by means of groups 29 and 30 of angle members having their ends rigidly secured to the head members by any suitable means such as welding. By viewing Figs. 1 and 2, it will be observed that there are four angle members in each group 29 and 30, so positioned as to provide spaced horizontal parallel walls between the four members in each group, when the unit is in the position shown in Fig. 2, and parallel vertical walls between the inner pairs of angle members of each group. Between the spaced horizontal walls in the groups of angle members 29 and 30 are disposed supporting arms 35, 36, 37 and 38. The supporting arms are substantially square in cross sectional contour, yet they are reduced adjacent the centers thereof so as to be received between the horizontal parallel walls shown in Fig. 2 and thus be rigidly secured and supported by the groups of angle members constituting a part of the frame of the rotary unit. The supporting arms are spaced as illustrated in Figs. 1 and 2 and the outer ends thereof are apertured, the outer ends of the arms 35 and 36 being apertured to receive locking pins 40 while the outer ends of the arms 37 and 38 are apertured to receive pivot pins 41.

The pivot pins 41 support frames 43 and 44, which frames might hereinafter be referred to as pivotal frames. The pivotal frames consist of spaced flat strips 45 having their ends secured to strips 46, bent so that the central portions thereof, as illustrated in Fig. 2, are spaced from their respective strips 45. The upper ends of the strips 45 and 46 are secured to each other and to bearing members 47 rotatably mounted upon the pivot pins 41. The lower ends of the strips 45 and 46 are secured to each other and to apertured lugs 48 for receiving the locking pins 40. The locking pins 40 are removable to permit swinging of the pivotal frames about their pivots and are each provided with a handle at one end, their other ends having circumferential grooves to receive spring pressed latches 49 carried by the arm 36 to lock the pins in place.

Considering one pivotal frame, attention is directed to Figs. 2, 3 and 4, where there is shown a supporting plate 50 disposed between the sets of strips 45 and 46 constituting the frame sections, as illustrated in Fig. 4, and having reduced projections 51 extending between the plates of the frame sections, where they rest upon supporting blocks 52. Each strip 45 of the pivotal frame sections has one of the blocks 52 mounted thereupon for supporting the projections 51 of the supporting plate 50. At each side of each projection 51 and block 52 retaining lugs 53, having enlarged portions overhanging the projections, are disposed and secured in place by any suitable means, such as machine screws, to firmly secure the supporting plate 50 in the pivotal frame 44.

As shown in Fig. 3, a bearing supporting housing 55, having a flanged inner end secured to the supporting plate 50 by suitable means, such as machine screws, is of a suitable contour to receive therein bearings 56 and 57 to rotatably support an arbor shaft 58 upon which an arbor 59 is mounted. The arbor 59 is arranged to removably receive a pad 60 (Fig. 2) of material such as paper tape, which is to be served upon the core 23. A disk-like member 61 threadedly mounted upon the arbor supports the pad 60 at one side thereof. Adjacent the member 61 on the arbor, a ring gear 62 is mounted and interengages a gear 63 to rotate a shaft 64 upon which the gear 63 is mounted. The shaft 64 is rotatably journalled in a bearing 65 supported by an integral projection 66 of the supporting plate 50.

A fluid housing 70 composed of cylindrical portions 71 and 72 and a cover portion 73 are secured together and to the supporting plate 50 by suitable means, such as bolts, extending through the outer portion of the cover portion 73 and an integral annular flanged portion 75 of the cylindrical portion 71.

The cylindrical portion 71 composes slightly less than half the housing 70 and houses an inner chamber 76. The housing 72 is of the genral contour shown in Fig. 3, providing an outer chamber 77 and a dividing portion or partition 78. The partition 78 has a concave wall 79 to close the inner chamber 76 and an integral hollow central projection 80 extending through the inner chamber and having its end embedded in a recess in the end wall of the cylindrical portion 71. Outlet openings or passageways 81 are formed in the central projection 80 at diametrically opposed positions adjacent the concave wall 79 to provide outlets for the inner chamber 76. A valve 85 is rotatably disposed in the hollow central projection portion 80 and extends through the partition 78, as shown in Fig. 2. Apertures 86 extend transversely through the valve 85 at spaced positions and are connected to each other by an axially disposed aperture. The combined apertures 86 with their connecting axial aperture are substantially H-shaped and one of the apertures 86 is positioned to communicate with the passageways 81. A passageway 87 in the partition 78 disposed at right angles with respect to the axis of the passageways 81 is positioned to communicate with the other aperture 86. It will, therefore, be observed that the valve 85 when in the position shown in Figs. 3 and 4, will position the apertures 86 and their connecting axial aperture in communication with the passageways 81 and the inner chamber 76, whereas rotation of the valve one quarter of a revolution will cut off communication between the valve apertures and the passageways 81 and move the valve apertures into communication with the passageway 87 which lies within the outer chamber 77.

The valve 85 extends into the chamber 77, where it has secured thereto a bevelled gear 90, and is journalled in a suitable bearing 91 disposed between the bevelled gear and an internally extending integral sleeve portion 92 of the cover portion 73. The bevelled gear 90 interengages a bevelled gear 94 which is mounted upon the inner end of a shaft 95, the shaft being journalled in suitable bearings 96 and sealed by any suitable packing 97. The bearings 96 are supported in a bracket 98 mounted upon the housing 70, which in turn supports a bearing bracket 100 for a bearing 101 in which the shaft 64 is journalled. Bevelled gears 102 and 103 operatively connect the shaft 64 and 95, respectively.

A fluid 105, such as mercury, is disposed in the inner chamber 76, the quantity of the fluid depending upon the weight of the pad 60 of material. A plug 106 in the cover portion 73 may be removed for pouring the fluid 105 in the housing. Due to passageways 107 and 108 in the sleeve 92 the fluid may pass therefrom into the outer chamber 77. In order to allow the fluid to pass from the outer chamber 77 to the inner chamber 76 the unit 15 may be rotated until the housing is in a vertical position, the chamber 76 being beneath the chamber 77, at which time a threaded valve 110 may be actuated to open communication through a passageway 111 (shown in Fig. 5) between the chambers 76 and 77. After the fluid has passed into the inner chamber 76 the valve 110 may be closed, cutting off communication between the chambers other than through the valve 85.

Means is provided to direct tape 115 from the pad 60 to the advancing core 23, where the tape is wound spirally about the core during rotation of the unit 15. This means consists of a frame 116 of the contour shown in Figs. 1 and 2 and comprising a flat portion 117 having its outer edge disposed between the vertical parallel walls of the inner members of the groups 29 and 30 of the angle members, as shown in Fig. 2, and having a central hollow hub portion 118 for receiving a tubular guide 119 for the passage of the core 23 therethrough. The tubular guide 119 supports the core for some distance upon each side of the hub 118 and is slotted at 120 to receive the tape during the forming of the tape upon the core. A roller 121 supported by the angle members 29 is positioned to receive the tape from the pad 60. The tape is passing from the roller 121 is drawn transversely across the rotary unit, where it passes between a pair of rollers 122 and 123 over the roller 123 and around a roller 124, where the tape is directed through one of the slots 120 in the guide 119. The roller 123 is rotatably mounted upon a bracket 125 carried by the portion 117 of the frame 116, while the roller 122 may be termed a tension roller and is also supported by the bracket 125 and urged into close engagement with the tape by means of a spring 126.

The drawings illustrate the rotary unit 15 with one serving unit and one material directing means for applying a covering on the core 23 of the single tape taken from the pad 60. When only one serving mechanism is employed a weight member 130 is mounted upon the supporting plate 50 of the other pivotal frame 43, as shown in Fig. 2, the weight of the member 130 being equal to the serving mechanism carried by the other pivotal frame including a full pad 60 with the fluid 105 in the inner chamber 76. It is to be understood, however, that the invention includes as one embodiment the rotary unit 15, with a serving mechanism carried by each pivotal frame and a material directing means for the tape of each mechanism to simultaneously wrap two tapes spirally about the core. It is not believed necessary to add to the drawings figures illustrating the rotary unit with two serving mechanisms and two material directing means, but that such an embodiment of the invention may be fairly understood from the present disclosure.

Considering first the operation of the apparatus with the single serving mechanism and a single directing means, let it be assumed that a full pad 60 is mounted upon the arbor 59, that the free end of the tape is threaded around the roller 121 between the rollers 122 and 123 around the roller 124 and extended through slot 120 in the guide 119, where the tape is wound about the core 23 sufficiently to start the wrapping thereof when the apparatus is set in motion. When the tape is suitably threaded and the fluid 105 is in the chamber 76 the apparatus may be set in motion through the connection of the chain 27 to the power means (not shown) to rotate the unit 15 in the direction of the arrow (Fig. 2). During this rotation of the unit the tape 115 will be withdrawn from the pad, causing rotation of the pad and in turn causing rotation of the arbor 59.

Attention is now directed to Figs. 2 and 3, wherein it will be observed that rotation of the arbor 59 will cause rotation of the gear 62, the gear 63, the shaft 64, the bevelled gear 102, the bevelled gear 103, the shaft 95, the bevelled gear 94, the bevelled gear 90, resulting in rotation of the valve 85. Rotation of the unit 15 causes the fluid 105, through centrifugal force, to pass in limited quantities through the passageways 81 and into the apertures 86 and their connecting axial apertures. The quantity of the fluid leaving the chamber 76 is limited by the capacity of the valve apertures. This quantity of fluid is allowed to pass, by means of centrifugal force, from the valve apertures and through the passageway 87 into the chamber 77, when the valve 85 is rotated a sufficient distance to move the valve apertures into communication therewith. It will, therefore, be understood that as the tape is withdrawn from the pad and the pad becomes lighter in weight the fluid 105 is transferred in limited quantities from the inner chamber 76 to the outer chamber 77 and, due to centrifugal force, the fluid in entering the outer chamber 77 will lie against the inner wall of the cover portion 73 and gradually build up toward the partition 78 past the outer chamber is gradually filled with the fluid. The fluid controlling means, namely the valve 85 with its associated passageways and apertures, is so linked with the arbor 59 and the pad carried thereby, that the fluid weight is moved outwardly to effectively increase the weight at the serving side of the rotary unit to compensate for the decrease in weight of the pad 60 during the removal of the tape therefrom. To illustrate this feature, attention is directed to Fig. 7, which schematically illustrates the serving mechanism and its association with the advancing core. The chambers 76 and 77 are so proportioned that $$\frac{d1}{d2} = \frac{r1}{r2}$$

when $d1$ $d2$ are the displacements at the start and end of the cycle and $r1$ $r2$ are maximum and minimum radii of the pad 60. If $w$=weight of the fluid 105 then $wD=WR$. In the present embodiment the fluid 105 is mercury and the weight of the mercury $w$=weight of the pad $W$; then $D$, displacement of mercury during a full cycle=$R$, eccentricity of the pad. Therefore, the moments of inertia of the two masses, namely, the material and the fluid being equal the centrifugal forces thereof are equal.

In this embodiment, during the shifting of weight in the serving mechanism to compensate for the variation in weight of the pad the weight of the member 130, of course, remains constant. In other words, the serving mechanism automatically controls the weight of one side of the serving head during the removal of the tape or the constant decreasing in weight of the pad to maintain a balance of one side of a rotary unit with a constant standard on the other side thereof. In this manner the rotary unit is balanced at all times regardless of variations in the weight of the pad, making it possible to rotate the unit at a high rate of speed without vibration or other damaging effects resulting from unbalanced units. The smooth and uniform rotation of the balanced rotary unit eliminates wear and makes possible the uniform application of the material upon the core at a higher rate of speed than would be possible with an unbalanced rotary unit.

When the material of the pad is paid out and the fluid from the inner chamber has passed into the outer chamber the apparatus may be stopped and conditioned for further service. To condition the apparatus for further service the locking pin 40 of the pivotal frame 43 carried by the serving mechanism is removed by moving the spring pressed latch 49 free of the slot in the pin. The pivotal frame with the serving mechanism may then be moved arcuately, as illustrated in dotted lines in Fig. 2, to a position where a new pad 60 may be inserted in place upon the arbor 59. During the placing of the new pad upon the arbor the threaded valve 110 is actuated to open the passageway 111 and allow the fluid to pass from the outer chamber 77 by means of gravity into the inner chamber 76. When this has been accomplished the valve 110 is closed and the serving mechanism on its pivotal frame may be swung in position and locked in place by its pin 40.

When it is desirable to employ two serving mechanisms the weight member 130 is removed from its supporting plate 50 and a serving mechanism, identical in construction and operation to the one illustrated and described, is secured in place upon the said supporting plate so as to provide two serving mechanisms, one upon each side of the advancing core. The directing means for the second serving mechanism will be identical to that shown for the first serving mechanism, the only difference being in the position thereof, the position being to direct this tape to the core at a position diametrically opposed the point of serving of the other tape. For this purpose there are two elongate slots 120 in the tubular guide 119 at diametrically opposed positions. When two serving mechanisms are employed let it be assumed that at the beginning of the operation the pads 60 of both mechanisms are full and that the fluid 105 in each housing is disposed in the inner chamber 76. In this instance rotation of the unit 15 will cause the pads to decrease in weight simultaneously and if the tapes should be withdrawn at the same speeds the weight of the pads would be maintained equal at all times during the serving, and like quantities of fluid would be transferred to each outer chamber 77 from their respective inner chamber 76. However, the rotary unit will be equally balanced at all times during its rotation, regardless of the comparative sizes and weights of the pads and the relative speeds at which the tapes are removed, due to the fact that the auxiliary weight of each portion of the unit, namely the fluid 105 therein, is varied or transferred from the inner chamber to the outer chamber thereof, dependent upon the variation of the weight in its respective material or pad 60. In other words, each portion of the unit, that is, each serving mechanism, is independent of the other, yet it is so operated that the effective weight of its half of the unit will at all times be equal to the effective weight of the other portion or serving mechanism, regardless of the size or weight of its pad, and may in this manner result in the independent operation of each portion of the unit to maintain an effective balancing of the unit.

In the present embodiment of the invention the material 115 of the pad 60 is paper tape, but it should be understood that any substance may be used, the purpose of the invention being to maintain the rotary unit 15 balanced during variation or decrease in weight of the substance carried thereby. This balance is maintained by the shifting of an auxiliary weight means, which in the present embodiment is a fluid, for example, mercury, transferred in quantities under the control of the rotary element or arbor 59, which is rotated during the removal of the material. It is apparent that during rotation of the unit 15 at a constant speed the material or tape will be withdrawn from the pad at a constant speed. However, the arbor or element 59 will not be rotated at a constant speed but the speed of rotation thereof will be gradually increased as the diameter of the pad 60 decreases. The valve 85 being controlled by the rotation of the arbor gradually increases in speed with the increase in speed of the rotation of the arbor. It will be observed that during the slower rotary movement of the valve 85, which occurs when the pad 60 is full, the quantities of fluid released from the inner chamber and passing into the outer chamber will, due to centrifugal force, pass outwardly to the cover portion 73. These quantities of fluid will build up inwardly from the cover portion 73 with gradual increasing rapidity during the decrease in diameter of the pad. Now, therefore, with each quantity of fluid being substantially equal in weight to the weight of the material which has been removed from the pad during the transfer of this quantity of fluid from the inner chamber to the outer chamber, the unit is maintained balanced. These quantities of fluid are most effective when in the outermost positions adjacent the cover portion 73 to counterbalance the unit and to compensate for the material removed from the pad, these quantities becoming slightly less effective, however, as the body of fluid in the outer chamber 77 builds up toward the axis of rotation of the unit. For this reason it is necessary that the quantities of fluid be transferred from the inner chamber to the outer chamber at an increasing rate to compensate for the weight of the material as it is removed from the rotary unit at a constant rate. Computations show that the two opposing tendencies are exactly equal throughout the rotation of the unit.

These embodiments of the invention herein disclosed are illustrative only and may be widely modified and departed from in many ways without departing from the spirit and scope of the invention as pointed out in and limited only by the appended claims.

What is claimed is:

1. In a material handling apparatus, a unit rotatable about an axis, a material supporting member carried by the unit, means to cause variation in the quantity of a material supported by the member, weight means, and means controlled by variation in the quantity of the material on the support to cause movement of quantities of the weight means varying distances from the axis to balance the unit.

2. In a material handling apparatus, a balanced rotary unit, means tending to unbalance the unit, and movable weight means controlled by the said first named means to maintain the unit balanced.

3. In a material handling apparatus, a rotary unit, a rotary element carried by the unit for supporting material removable during rotation of the unit to cause rotation of the element, movable weight means, and means actuated by the rotation of the element to cause movement of the weight means.

4. In a material handling apparatus, a rotary unit, a rotary element carried by the unit for supporting material removable during rotation of the unit to cause rotation of the element, a fluid weight means, and means actuated by the rotation of the element to cause movement of the weight means.

5. In a material handling apparatus, a rotary unit, an element carried by the unit to support material removable during rotation of the unit, a fluid carried by the unit, and means affected by the removal of the material to free the fluid for movement of the fluid by centrifugal force to balance the unit.

6. In a material handling apparatus, a rotary unit, an element carried by the unit to support material removable during rotation of the unit, a fluid carried by the unit, and means affected by the removal of the material to free the fluid in quantities proportional in weight to the weight of the material being removed from the pad for movement of the fluid by centrifugal force to balance the unit.

7. In a material handling apparatus, a balanced rotary unit including a substance of predetermined weight, means to remove continuous quantities of the substance resulting in a decrease in the weight thereof during rotation of the unit, a fluid of a weight comparable to the weight of the substance, compartments for the fluid, and means to transfer the fluid from one compartment to another in quantities proportional in weight to the decrease in weight of the substance to maintain the unit balanced.

8. In a material handling apparatus, a balanced rotary unit including a substance of predetermined weight, means to remove continuous quantities of the substance resulting in a decrease in the weight thereof during rotation of the unit, a fluid of a weight comparable to the weight of the substance, compartments for the fluid, and means controlled by the removal of the substance to transfer the fluid from one compartment to another in quantities proportional in weight to the decrease in weight of the substance to maintain the unit balanced.

9. In a material handling apparatus, a balanced rotary unit including a substance of predetermined weight, means to remove continuous quantities of the substance resulting in a decrease in the weight thereof during rotation of the unit, a fluid of a weight comparable to the weight of the substance, chambers for the fluid disposed varied distances from the axis of rotation of the unit, and means to free quantities of the fluid from one of the chambers to be moved by centrifugal force into the other chamber to maintain the unit balanced.

10. In a material handling apparatus, a balanced rotary unit including a substance of predetermined weight, means to remove continuous quantities of the substance resulting in a decrease in the weight thereof during rotation of the unit, a fluid of a weight comparable to the weight of the substance, chambers for the fluid disposed varied distances from the axis of rotation of the unit, means to free quantities of the fluid from one of the chambers to be moved by centrifugal force into the other chamber to maintain the unit balanced, and means to cause the fluid to return to the first chamber.

11. In a material handling apparatus, a balanced rotary unit including a substance of predetermined weight, means to remove continuous quantities of the substance resulting in a decrease in weight thereof during rotation of the unit, a fluid of a weight comparable to the weight of the substance, chambers for the fluid disposed varied distances from the axis of rotation of the unit, and means controlled by the removal of the substance to free the fluid from one chamber to pass into the other by centrifugal force to cause an increase in the effective weight of the fluid proportional to the decrease in weight of the substance.

12. In a material handling apparatus, a balanced rotary unit including a substance, means to remove quantities of the substance causing a decrease in the weight thereof and tending to unbalance the unit, a fluid, and means to shift the fluid to compensate for the decrease in the weight of the substance to maintain the unit balanced.

13. In a material handling apparatus, a balanced rotary unit, elements carried by the unit at spaced positions for supporting pads of material, means to remove material from the pads at varying rates causing a decrease in the weight thereof, and means affected by the removal of the material from each pad to compensate for the decrease in weight thereof.

14. In a material handling apparatus, a balanced rotary unit having a pivotal frame, means to removably latch the frame against displacement, a rotary element carried by the frame for supporting a pad of material, means to cause rotation of the element by causing removal of the material from the pad during rotation of the unit tending to unbalance the unit, a housing carried by the frame and having an inner and outer chamber, a valve having a passageway intermittently communicating with the chambers when actuated, and means controlled by the rotation of the element to actuate the valve to transfer quantities of the fluid from the inner chamber to the outer chamber to maintain the unit balanced.

15. In a material handling apparatus, a unit rotated about an axis and including a fixed weight at one side of the axis, a support for a substance of a predetermined weight disposed at another side of the axis, means to remove quantities of the substance resulting in a decrease in weight thereof during rotation of the unit, and weight means disposed at the side of the axis with the substance to maintain the unit balanced.

16. In a material handling apparatus, a unit rotated about an axis and including a fixed weight at one side of the axis, a support for a substance of a predetermined weight disposed at another side of the axis, means to vary the weight of the substance on the support, and weight means disposed at the side of the axis with the substance to maintain the unit balanced.

17. In a material handling apparatus, a unit rotated about an axis and including a fixed weight at one side of the axis, a support for a substance of a predetermined weight disposed at another side of the axis, means to move the support to vary the weight of the substance on the support, and weight means disposed at the side of the axis with the substance and controlled by movement of the support to maintain the unit balanced.

18. In a material handling apparatus, a unit rotated about an axis and including a fixed weight at one side of the axis, a support for a substance of a predetermined weight disposed at another side of the axis, means to vary the weight of the substance on the support, weight means, and means to cause movement of quantities of the weight means predetermined distances from the axis to balance the unit.

19. In a material handling apparatus, a unit rotated about an axis and including a fixed weight at one side of the axis, a support for a substance of a predetermined weight disposed at another side of the axis, means to vary the weight of the substance on the support, weight means, and means to cause movement of quantities of the weight means varying distances from the axis to balance the unit.

20. In a material handling apparatus, a unit rotated about an axis and including a fixed weight at one side of the axis, a support for a substance of a predetermined weight disposed at another side of the axis, means to vary the weight of the substance on the support, weight means, means to cause movement of quantities of the weight means predetermined distances from the axis to balance the unit, and means to vary the said quantities of the weight means.

21. In a material handling apparatus, a unit rotated about an axis and including a rotatable support for material removable to cause rotation of the support at varying speeds, and weight means moved by the support at speeds variable with variations in the speed of rotation of the support to balance the unit.

22. In a material handling apparatus, a unit rotated about an axis and including a rotatable support for material removable at a constant rate of speed to cause rotation of the support at a varying rate, weight means, and means controlled by the support to move the weight means at a varying rate to compensate for the constant variation caused by the removal of the material to balance the unit.

23. In a material handling apparatus, a unit rotated about an axis and including a rotatable support for material removable at a constant rate of speed to cause rotation of the support at a varying rate, fluid weight means, and means controlled by the support to move the weight means at a varying rate to compensate for the constant variation caused by the removal of the material to balance the unit.

HARRY H. MERWIN.
ELLWOOD W. REYNOLDS.